United States Patent
Drabek et al.

(10) Patent No.: US 7,467,563 B2
(45) Date of Patent: Dec. 23, 2008

(54) SHIFTING DEVICE WITH A SINGLE ROD ON A GEARBOX

(75) Inventors: Michael Drabek, Brandenburg (DE); Jan-Peter König, Groß-Kreutz (DE)

(73) Assignee: ZF Friedrichshafen AG, Friedrichshafen (DE)

(*) Notice: Subject to any disclaimer, the term of this patent is extended or adjusted under 35 U.S.C. 154(b) by 256 days.

(21) Appl. No.: 10/586,517

(22) PCT Filed: Feb. 2, 2005

(86) PCT No.: PCT/EP2005/001007

§ 371 (c)(1),
(2), (4) Date: Jul. 18, 2006

(87) PCT Pub. No.: WO2005/078320

PCT Pub. Date: Aug. 25, 2005

(65) Prior Publication Data
US 2007/0157753 A1 Jul. 12, 2007

(30) Foreign Application Priority Data
Feb. 11, 2004 (DE) ............ 10 2004 006 682

(51) Int. Cl.
*F16H 59/00* (2006.01)
(52) U.S. Cl. ........................................ 74/335
(58) Field of Classification Search ............... None
See application file for complete search history.

(56) References Cited

U.S. PATENT DOCUMENTS

| | | | | |
|---|---|---|---|---|
| 1,928,782 A | * | 10/1933 | Church | 74/359 |
| 2,906,139 A | | 9/1959 | Ferchl et al. | |
| 3,431,791 A | * | 3/1969 | Labat | 74/473.24 |
| 3,487,713 A | * | 1/1970 | Sturmer | 74/473.1 |
| 4,432,251 A | * | 2/1984 | Malott | 74/337.5 |
| 6,691,590 B1 | | 2/2004 | Patzner et al. | |
| 7,070,535 B2 | * | 7/2006 | Wittkopp et al. | 475/303 |
| 7,093,511 B2 | * | 8/2006 | Norum et al. | 74/335 |
| 7,311,015 B2 | * | 12/2007 | Kluge | 74/337.5 |
| 7,313,979 B2 | * | 1/2008 | Ehrlich et al. | 74/335 |
| 7,353,726 B2 | * | 4/2008 | Beer et al. | 74/340 |
| 2006/0117892 A1 | | 6/2006 | Ebenhoch et al. | |

FOREIGN PATENT DOCUMENTS

| | | |
|---|---|---|
| DE | 922 508 | 1/1955 |
| DE | 39 34 733 A1 | 4/1990 |
| DE | 102 31 547 A1 | 1/2004 |
| DE | 102 53 471 A1 | 8/2004 |
| FR | 2 831 634 | 5/2003 |
| WO | WO-01/31233 A1 | 5/2001 |

* cited by examiner

*Primary Examiner*—Dirk Wright
(74) *Attorney, Agent, or Firm*—Davis Bujold & Daniels, P.L.L.C.

(57) ABSTRACT

A switching mechanism of a multiple change-over gear with an axially displaceable and pivoted gearshift lever shaft having a shift finger formed on the gearshift lever shaft with switching wings which are operatively connected with a synchronization and coupling device for wheels supported on a wheel set shaft of the gearing unit, and with cams formed on the switching wings with which the shift finger can mesh for the execution of a process of gear ratio modification and, over the cams, can axially displace the switching wings.

12 Claims, 3 Drawing Sheets

SHIFTING DEVICE WITH A SINGLE ROD ON A GEARBOX

This application is a national stage completion of PCT/EP2005/001007 filed Feb. 2, 2005 which claims priority from German Application Serial No. 10, 2004 006 682.5 filed Feb. 11, 2004.

FIELD OF THE INVENTION

The invention concerns a switching mechanism in a multiple change-over gear.

BACKGROUND OF THE INVENTION

From DE 39 34 733 A1, the expert is acquainted with a remote-control switch mechanism for a multistage change-over gear, in which a hand operated lever is connected over a change-over shifter rod with a gear-shifting shaft. This operative connection is chosen in such a way that a selective motion of the hand operated lever leads to an axial movement of the gearshift lever shaft and a switch motion produces the rotation of the gearshift lever shaft around its longitudinal axis.

A shift finger is formed on this gearshift lever shaft, which alternatively can mesh with the recess of shift rails and displace them axially. These shift rails on their part stand in operative connection with synchronization and coupling devices on wheel set shafts of the change-over gear in such a way, that in the execution of concrete processes of gear ratio modification, gearless wheels decelerate and can be connected in a torque proof manner to the gear shaft which carries them.

In such a combination of change-over gear and gear shift device, it is expedient in the realization of a short overall length of the gearing unit and low production costs, to arrange a synchronization and coupling device respectively between two lot gear wheels, which belong to two gears in the switching lane of an H-switching mechanism.

In this way, narrow limitations are imposed on the gearing unit construction, as well as the construction of the gear switching mechanism. Especially with a gearing unit with two lot wheels supported next to each other on a wheel set shaft, which do not belong to two gears that are arranged in a switching lane of an H-switching mechanism, a mechanical conversion mechanism is necessary, which, for instance with a switch motion of the gear shifting lever from first to second gear produces a shift out of gear of the synchronization and coupling device for first gear as well as a shift into gear of another synchronization and coupling device for second gear.

Based on this background, DE 102 31 547 A1 is known as a switching mechanism for a change-over gear, in which at least one of its switch sets is assigned to two gear ratio levels of the gearing unit which do not follow one another. Moreover, this switching mechanism is equipped with a mechanical conversion device, by means of which a hand-operated switching mechanism with an H-gear shifting gate can switch such a gearing unit.

With this switching mechanism, the gear shifting lever is directed into the H-gear shifting gate and coupled with two gearshift lever shafts, so that a movement of the switching lever into a switching lane leads to a swiveling of the first gearshift lever shaft along its longitudinal axis. In addition, a first gear wheel is attached to the first gearshift lever shaft, which meshes with a second gear wheel on the second gearshift lever shaft. With a rotation of the first gearshift lever shaft, the second gearshift lever shaft therefore counter rotates in the other direction. For the selection of a switching lane through the gear shifting lever, both gear shifting lever shafts are displaced in a forced coupling parallel to their longitudinal axis.

In addition, these two gearshift lever shafts possess shift fingers, which, depending on the gear shifted into, mesh with individually geared recesses of shifter rods, which are connected with shift claws. These shift claws on their part are connected with the shift sleeves of the shift sets, which in a switch operation are displaced to the torque proof connection of lot wheels with a gear shaft axially onto the respective gear shafts. p In addition, DE 102 53 471 A1, which is not published, describes a single rod gearshift for randomly settable gear positions of a change-over gear, in which a shifter lever and selector lever on the driver's side is coupled with an axially displaceable shift finger shaft, which can swivel around its longitudinal axis. This shift finger shaft, at every gear speed, possesses shift fingers for shifting into and out of gears, which mesh with the notches of respectively two switch housings assigned to gears.

For the selection of a gear, the shift finger shaft is axially displaced and for shifting into a gear is rotated around its longitudinal axis, so that in relation to the gear, respectively one shift finger meshes with one notch of the selected switch housing and displaces this essentially vertically to the longitudinal axis of the shift finger shaft. Shifter rods connected with the switch housings bear respectively upon shift claws, with which shift sleeves are axially displaceable upon them to a torque proof connection of gearless cog wheels with their wheel set shaft.

In addition, stop cams which can hinder an unallowable entrance of shift fingers into the respective shift housing, and which point radially to the shift finger shaft are formed on the shift housing.

Although these shifting mechanisms are connected with the advantage that, for instance, with the described gear and switch set arrangement, the gearing unit structure of a double coupling gearing unit is, with retention of almost all its components, also usable as a hand operated gearing unit as well as being switchable with an H-gear shifting gate, nevertheless the structure of these switching mechanisms is mechanically comparatively complex.

Upon this background, the task is, therefore, to introduce to the invention a switching mechanism for change-over gears, which features a mechanically more simple construction, whose operation can be more easily made automatic, and which is usable for double coupling gearing units as well as for change-over gears with only one low gear and switch coupling.

SUMMARY OF THE INVENTION

Underlying the invention is the realization that the construction of such a gear switching mechanism can be simplified, if all gears are attainable and can be switched with only one gearshift lever shaft as well as without assigned shift housings, in spite of an arrangement of the gear speed cog wheels on the wheel set shaft of the gearing unit that is not switching lane based.

Thus the invention pertains to a switching mechanism in a multiple change-over gear with an axially displaceable and pivoted gearshift lever shaft, with shift fingers that are formed on the gearshift lever shaft with switching wings which are operatively connected respectively with a synchronization and coupling device (switch set), and with cams that are respectively formed on the switching wings, and with which the shift fingers can mesh in the execution of a process of gear ratio modification and which, above these, can displace the switching wings axially.

In the solution of the task at hand, it is intended in combination with the previously mentioned characteristics, that each of the switching wings be assigned to at least one shift finger, that the cam or cams of each switching wing features an essentially U-shaped cross-section profile with a short shank and a long shank by which the length of the short shank is selected such that, on the one hand, in a non-deviated position, the assigned shift finger can be displaced laterally away over the short shank to docking on the long shank, as well as to deflection of the switching wing and, on the other hand, can be constructed for the return movement of the switching wing to the non-deviated position N against the short shank.

In a preferred development of the switching mechanism, it is additionally intended that the cams not be concentrically connected with a connection segment of the respective switching wing. Through this method, it is achieved that the shift finger assigned to a switching wing moves collision free over the short cam shank when descending into the cam and it is used in returning the switching wing to neutral position.

In accordance with another further development of the patent, the switching wings are respectively pivoted in a swingable pivot and feature a meshing element on the end that guides from the cam, which is operatively connected with the assigned synchronization and coupling device of the change-over gear.

In addition, the switching mechanism can be equipped with pivoted shift levers which, on their one end, likewise possess a cam with which a shift finger of the gearshift lever shaft can mesh. A meshing element is formed on their opposite end, which protrudes into the zone of contact of a cam of a shifting wing. Through this interaction of the external shift and selector operation (gearshift lever shaft with shift finger) with a shift lever and a switching wing, an inversion of the swiveling motion of the switching wing is attainable in comparison to that with a direct coupling of gearshift lever shaft/shift finger and switching wing.

In addition, it appears to be significant if the shift fingers are arranged in axially variable positions and are formed with variable lengths on the gearshift lever shaft.

Beyond this, it can be advantageous for the practical design of the switching mechanism in this connection when the cams of the switching wings feature variable lateral distances from the gearshift lever shaft.

Regarding the formation of the short and long shanks of the cams of the switching wings and/or the shift lever, it is of particular significance that these are positioned in such a way in the switching mechanism, that in shifting into a gear G1, the assigned shift finger can cross the short shank of the cam collision free in the direction of the long shank, while the shift finger of the other gear G2, located in the same switching lane, moves away from the long shank of the cam assigned to this gear G2, and the short shank strokes over without collision.

As such, the switching mechanism, described above, can be used for every multiple change-over gear. Such a change-over gear can, for instance, be a five-speed or six-speed change-over gear, whose axial wheel set arrangement originating at a low gear element; a reverse gear RG and a second gear G2, a fourth gear G4 and a sixth gear G6, a third gear G3 and a first gear G1, a fifth gear G5 and, in the case of a seven-gear unit, a seventh gear G7.

This gearing unit can thereby be assembled as a double coupling gearing unit or a manual or else, as the case may be, an automatically shifting change-over gear with only one low gear and switch coupling, which possesses one or two countershafts and at least one gearing unit primary shaft.

Of particular advantage with this switching mechanism is that it can be put into operation by an external switching mechanism with an H-gear shifting gate. At the same time, the synchronization and coupling devices can be arranged randomly with reference to the lot wheels of the gearing unit so that, for instance, arranged on a wheel set shaft, one synchronization and coupling device shifts two gears arranged in a gearshifting gate with an H-shifting pattern, not in a switching lane (for example, reverse gear RG and second gear G2).

BRIEF DESCRIPTION OF THE DRAWINGS

The invention will now be described, by way of example, with reference to the accompanying drawings in which.

DETAILED DESCRIPTION OF THE INVENTION

Figure 1:
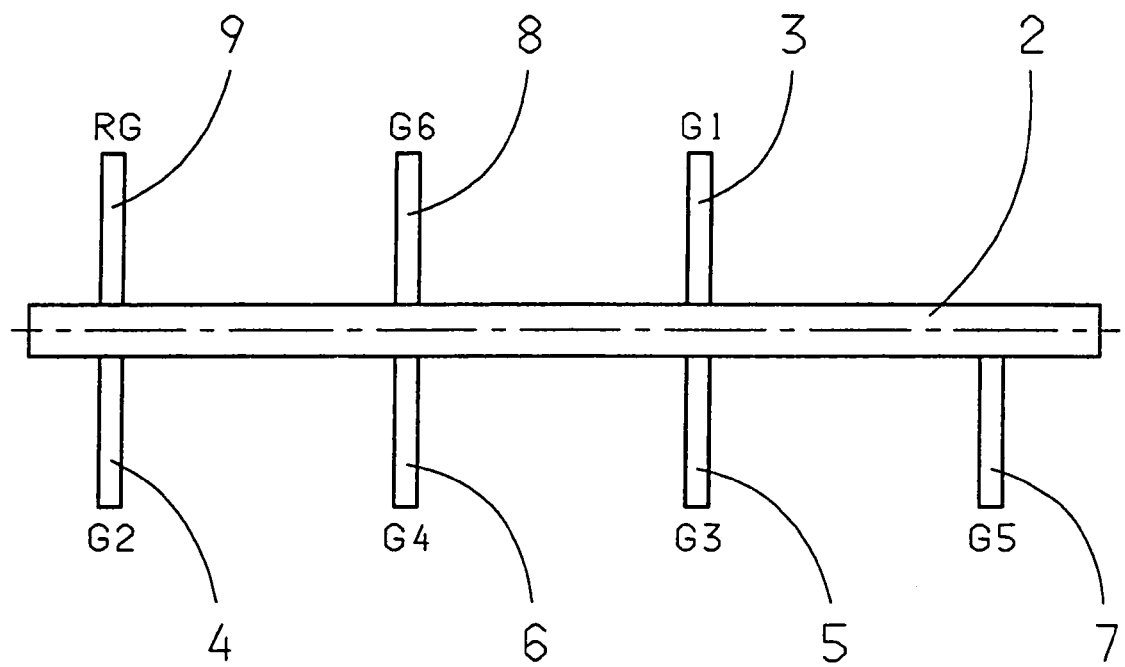
FIG. 1 is a gearshift lever shaft formed according to the patent.

Accordingly, FIG. 1 shows that the axially displaceable supported gearshift lever shaft 2, which can revolve around its longitudinal axis, possesses for each of five forward gears G1 through G5 and a reverse gear RG, respectively, individual shift fingers 3 through 9. These shift fingers bear upon respectively assigned switching wings in such a way that with these synchronization and coupling devices on a wheel set shaft of the gearing unit, axial displacement can occur. Such synchronization and coupling devices are, for instance, synchronous rings and shift sleeves with the help of which ungeared wheels are decelerated in the rotational speed of the wheel set shaft during a switching operation, which bears them and are connected torque proof with it.

Figure 2:
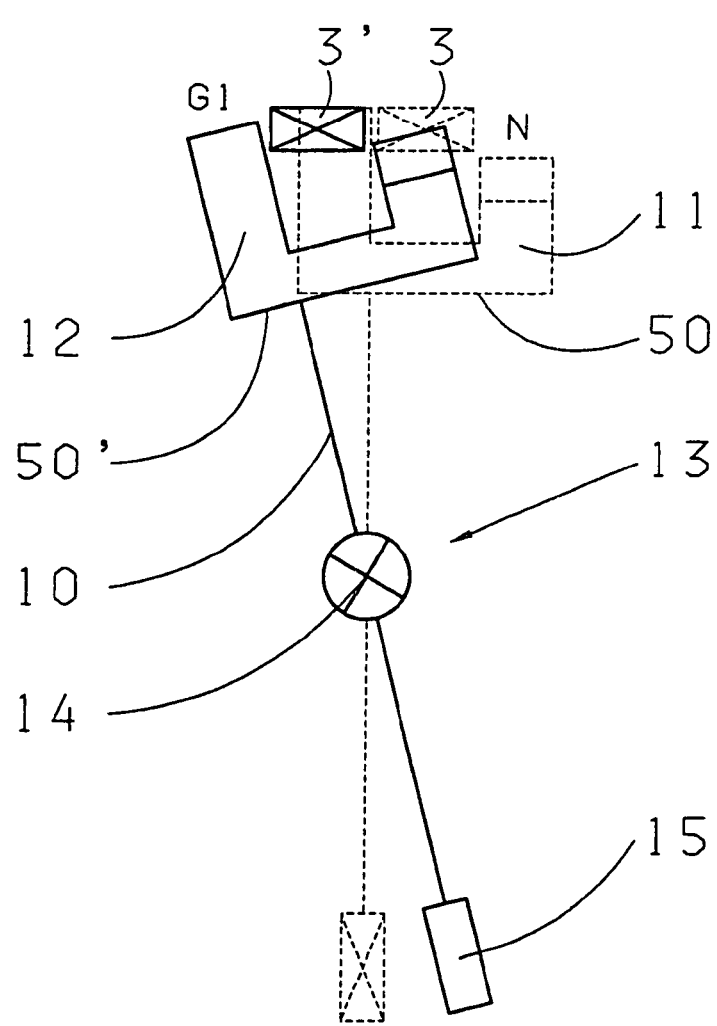
FIG. 2 is a schematic side view of a switching wing.

FIG. 2 shows the construction of such a switching wing 13 in a schematized side view in two positions, whereby this is the switching wing which is used in the other Figures in the operation of the first gear G1. The position represented with dots corresponds to a non-deviated position, while the switching wing drawn with running dashes is shown in a deviated position.

As can be clearly discerned from FIG. 2, such a switching wing 13 possesses a connection segment 10, on whose one end a cam 50 and on whose other end a meshing element 15 is formed. While the meshing element 15 stands in an operative connection with the above described synchronization and coupling device, shift finger 3 meshes with cam 50, which is assigned to switching wing 13. Additionally, it should be pointed out that switching wing 13 is pivoted in a swingable pivot 14, so that a deviation of the cam, for instance to the left, causes a deviation of the meshing element 15 to the right.

Of particular meaning for the mode of operation of the switching mechanism is, according to the invention, firstly, that cam 50 is not concentrically connected with the connection segment 10 of switching wing 13. In addition, cam 50 is formed so that it features an essentially U-shaped cross-section profile, which features a short shank 11 and a long shank 12.

Then with shift finger 3, if the switching wing is supposed to be swiveled for shifting into the first gear G1 from the neutral position, represented with dots, into the deviated position with the component part contours, drawn with running dashes, then shift finger 3, coming from the right through an axial motion of gearshift lever shaft 2, is directed initially over the short shank 11 and thrust against the long shank 12 (shift finger position 3'). Thus cam 50 swivels switching wing 13 to the left around swingable pivot 14 into a cam position 50', while meshing element 15 is swiveled toward the right.

After the displacement of switching wing 13 through shift finger 3, 3', the switching wing can be directed back into a neutral position N, represented with dots, such that shift finger 3 is displaced to the right through an axial displacement of gearshift lever shaft 2 out of its position 3'. In the process, the shift finger butts against the upper segment of the short cam shank 11 which, as a result of the eccentric arrangement of cam 50 on connection segment 10 of switching wing 13, protrudes so far towards shift finger 3, 3', that the shift finger finds a point of engagement for the return swiveling of switching wing 13.

This return movement process into the neutral position N continues to operate until the short cam shank 11 loses mechanical contact with shift finger 3. Subsequently, shift finger 3 remains between the short shank 1 and the long shank 12 or it is directed away through a further axial gearshift lever shaft displacement over the short cam shank 11.

A swiveling of switching wing 13 in the other direction, that is, so that cam 50 would be displaced towards the right out of the neutral position N, is not possible and also not desirable, since the synchronization and coupling device, which interacts with meshing element 15 (not represented here), in this opposite direction can shift into no gear which lies in the same switching lane of an H-switching mechanism, as the first gear G1. In contrast, the second gear G2, which is under discussion here, is operated by another shift finger and another switching wing, which is considered in connection with FIG. 3 and FIG. 4.

Figure 3:
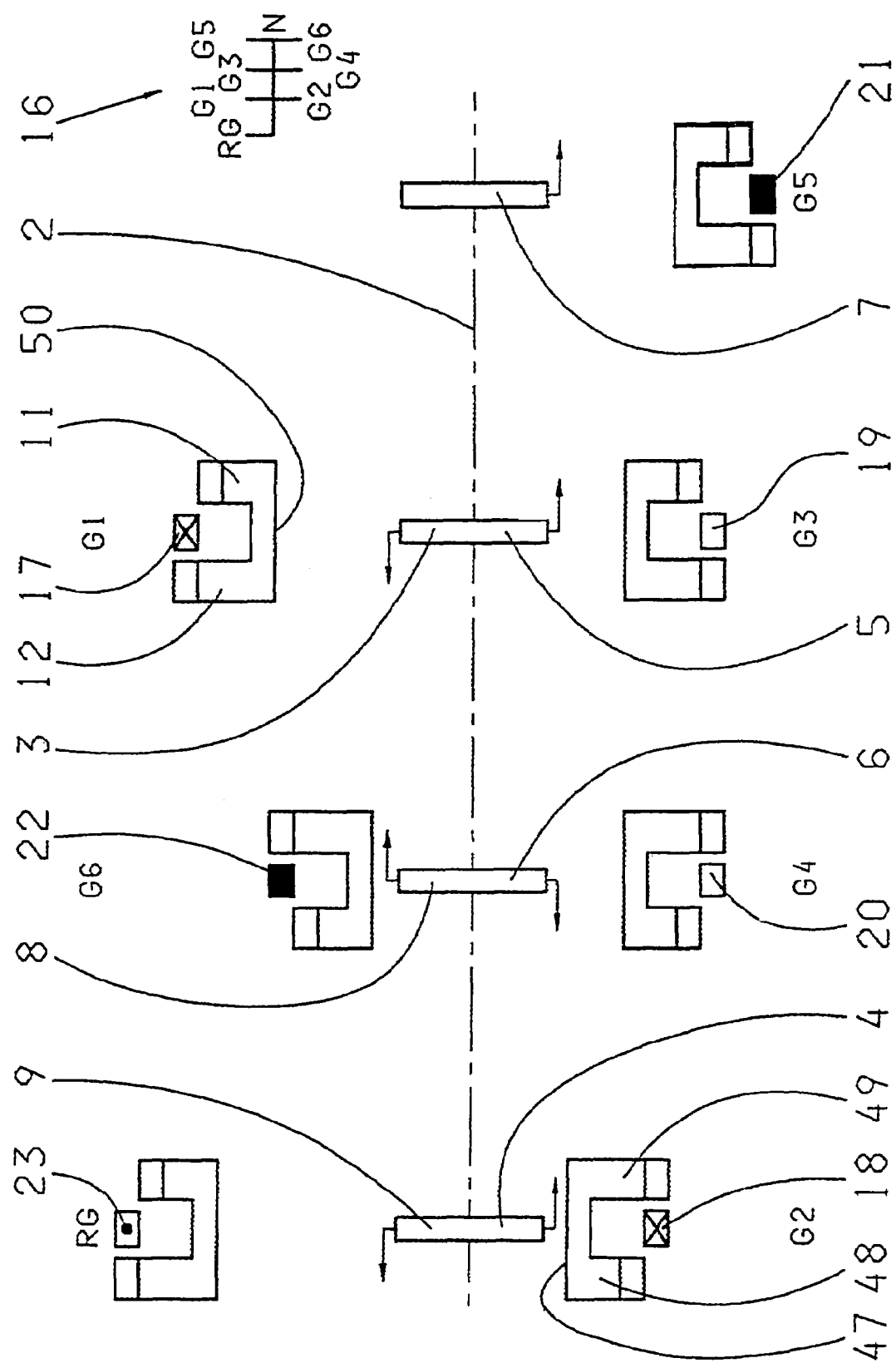
FIG. 3 is a schematic representation of the meshing of shift fingers with cams of switching wings.

Thus FIG. 3 shows a schematic representation of the meshing of shift fingers in cams of switching wings of the switching mechanism, according to the invention, on which the previously described shift fingers 3, 4, 5, 6, 7, 8, 9 are arranged in a symbolized gearshift lever shaft 2. As the directional markers arcing above and below the shift fingers indicate, gearshift lever shaft 2 can be displaced axially with its shift fingers 3, 4, 5, 6, 7, 8, 9 in shifting into gears RG, G1, G2, G3, G4, G5 and G6, whereby the directional markers denote the direction of motion of the respective cams.

Furthermore, FIG. 3 shows that, as it is known, an H-diagram of connections 16 does not agree with the arrangement of gears on the wheel set shaft of the gearing unit. Thus a simple transfer of the shifter lever motion in the gearshifting gate of the first gear G1 and the second gear G2 would lead, originating in the first gear G1, to shifting into the third gear G3 without further procedures.

Now in order as well to be able with such an H-gear shifting gate 16, to shift a gearing unit with the internal gearing unit gear speed arrangement as in FIG. 3, the patent provides that the position of shift fingers 3, 4, 5, 6, 7, 8, 9 to each other as well as with reference to the cams of the individual gear switching wings are so concerted, that a motion of switching into gear by a shift finger leads to an opposite motion of the shift finger for the other gear in the same switching lane. This can be well illustrated by way of FIG. 3 through a change from the first gear G1 and the second gear G2.

Therefore, as far as cam 50 of the switching wing for the first gear G1 is supposed to be displaced out of a neutral position 17 of shift finger 3 to the left for shifting into the first gear G1 so, at the same time, shift finger 4 for the second gear G2, originating from a neutral position 18, will also be directed towards the left over a short shank 48 of a cam 47 on the switching wing for the second gear G2.

For shifting out of the first gear G1, the shift finger 3 is directed through an opposite axial displacement of the gearshift lever shaft 2 towards the right so that the shift finger gets into a mesh with the now left upper corner of the short cam shank 11 and displaces this to the right into the neutral position 17 of the shift finger 3. At the same time, shift finger 4 is also directed to the right over the short shank 48 of cam 47 of the switching wing for the second gear G2 into its neutral position 18.

Therefore, as far as the second gear G2 should be put into gear through swiveling of the gearshifting lever in the switching lane G1-G2 of the manual operation mechanism 16, the depicted motion of the hand operated lever leads to a further axial displacement of the gearshift lever shaft 2 with the result that shift finger 4 butts against a long shank 49 of cam 47 of the switching wing for the second gear G2 and displaces it toward the right in FIG. 3.

Along with this goes a displacement of shift finger 3 towards the right so that it shifts from its neutral position 17 away over the short shank 11 of cam 50 of the switching wing for the first gear G1.

As FIG. 3 shows, the shifting into gear of the other gearing unit speeds, takes place fundamentally in the same manner, as well as the return motion of the switching wings into neutral positions 19, 20, 21, 22, 23, of the other gears. However, for the operation of the switching wings of the third gear G3, the fourth gear G4 and the fifth gear G5, respectively, a swivel direction reversal is required, for which in a refinement of the invention, isolated shift levers are provided.

Figure 4:
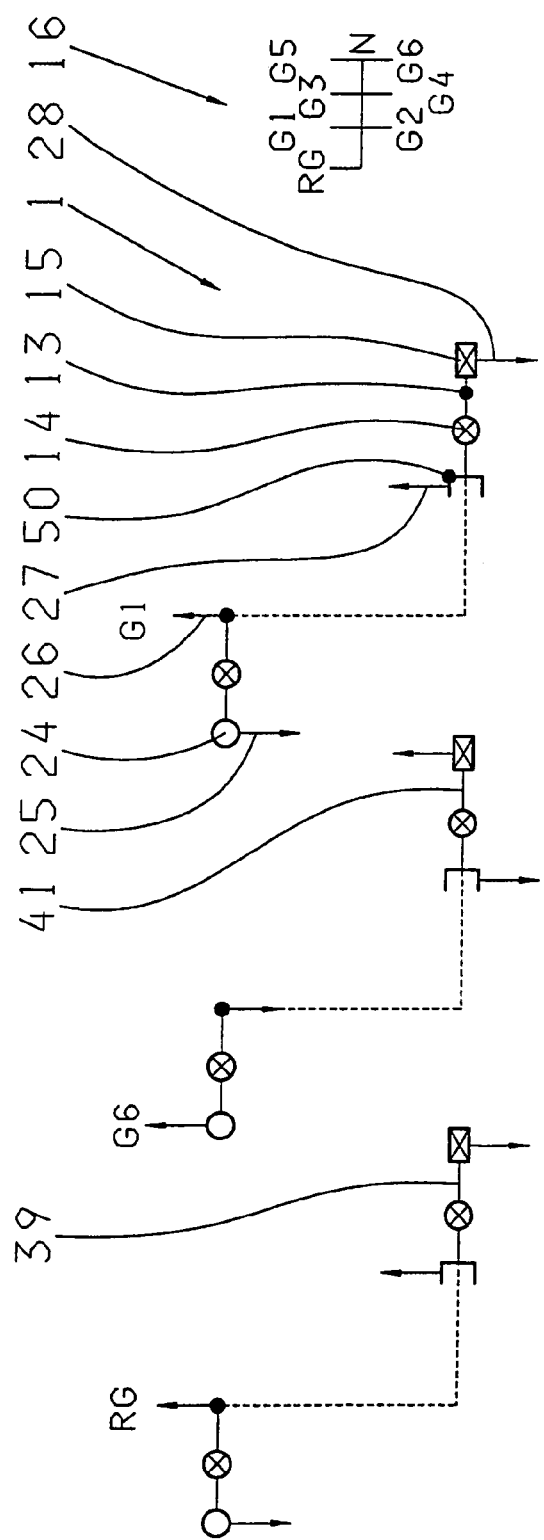
FIG. 4 is a schematic representation of the interaction of varying component parts of the switching mechanism.
Figure 4:
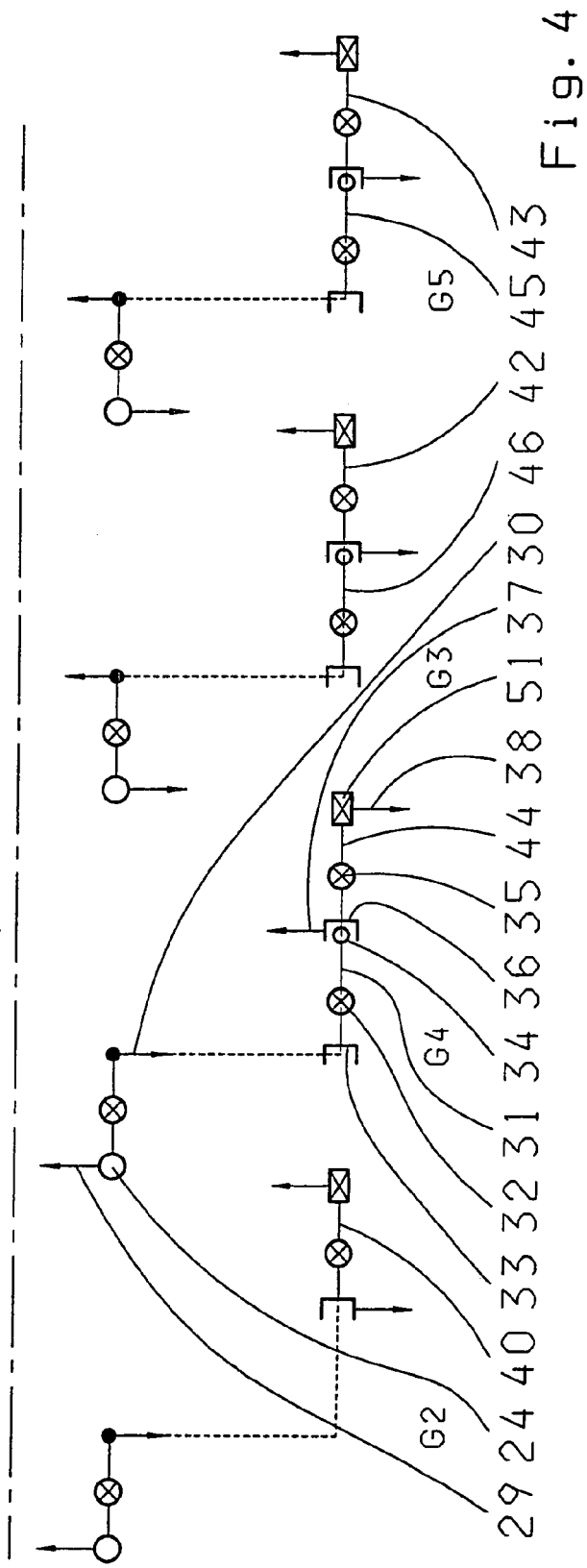

For this, FIG. 4 shows a schematized representation of the interaction of various component parts of switching mechanism 1 according to the invention. As was already illustrated with FIG. 2 and FIG. 3, for instance for shifting the first gearing unit gear G1 into gear, a switching wing 13 is provided whose meshing element 15 is in an operative connection with a synchronization and coupling device (not represented here). With cam 50 of switching wing 13 meshes shift finger 3 of the gearshift lever shaft 2 (not shown here), which stands in an operative connection with gearshifting lever 24 in H-switching mechanism 16. Through this design, a switch lever motion in a switching lane, as per directional marker 25, is initially converted into a motion 26, 27 of cam 50, while meshing element 15 and, for instance, a shift sleeve on a wheel set shaft of the gearing unit moves in a direction of marker 28 in shifting into first gear G1.

A comparable design and a comparable mode of operation result also for the reverse gear RG, the second gear G2 and a sixth gear G6, with their switching wings 39, 40, 41.

Now in order with only one gearshift lever shaft 2 to be able to attain and to shift all gearing unit gear speeds independently from the arrangement of the gear cog wheels on the wheel set shaft of the gearing unit, a shift lever 31, 45, 46 is provided for the third gear G3, the fourth gear G4 and the fifth gear G5, respectively, which serves as a mechanical connecting link between the respective shift fingers of gearshift lever shaft 2 and the cams of gear-specific switching wings 42, 43, 44.

As FIG. 4 shows in an exemplary manner, in shifting into the fourth gearing unit speed G4, gearshift lever shaft 2 (not represented here), stands in an operative connection with a shifting lever 24 of switch operation mechanism 16, which is external to the gearing unit, so that a motion of shifting into gear 29 of gearshift lever 24 leads to a motion 30 of gearshift lever shaft 2 and of the connected shift finger 6, for the fourth gear G4. Since shift finger 6 (not represented here), meshes with cam 33 of shifting lever 31. This leads, in reference to a meshing element 34 on shifting lever 31, to a pivoting motion 37 around a shift finger axis of rotation 32.

Because the meshing element 34 of shifting lever 31 meshes with a cam 36 of switching wing 44 for the fourth gear G4, the cam is also swiveled in direction 37. Since this switching wing 44 is pivoted around its axis of rotation 35, this also has effect on a meshing element 51 on switching wing 44, which stands in operative connection with the synchronization and coupling mechanism for the fourth gear G4.

Through the conceived structure, it is achieved that actuation 38 of switching wing 44 points in approximately a same direction 38 as actuation 30 of gearshift lever shaft 2 or, as the case may be, of shift finger 6. The same structure and the same mode of operation are also provided for the switch operation of gears G3 and G5.

The conceived switching mechanism 1 makes it possible, with the external gear switching mechanism 16 with H-gear shifting gate through a comparatively simple structure, to perform a gear selection and gear switch operation in all conceivable gear degree arrangements per se in one change-over gear for which only one gearshift lever shaft is necessary.

REFERENCE NUMERALS

1 Switching mechanism
2 Gearshift lever shaft
3 Shift finger
3' Shift finger position
4 Shift finger
5 Shift finger
6 Shift finger
7 Shift finger
8 Shift finger
9 Shift finger
10 Connection segment switching wing 13
11 Short shank
12 Long shank
13 Switching wing for first gear
14 Swingable pivot of the switching wing
15 Meshing element in a shift sleeve
16 H-switch system, Switch operation mechanism
17 Neutral position shift finger first gear G1
18 Neutral position shift finger second gear G2
19 Neutral position shift finger third gear G3
20 Neutral position shift finger fourth gear G4
21 Neutral position shift finger fifth gear G5
22 Neutral position shift finger sixth gear G6
23 Neutral position shift finger reverse gear RG
24 Gear shift lever
25 Shifting into gear motion of gear shift lever 24
26 Shifting into gear motion of shift finger 3
27 Shifting into gear motion of cam 50
28 Shifting into gear motion of switching wing 13
29 Shifting into gear motion of gear shift lever 24
30 Shifting into gear motion of shift finger 6
31 Shift lever for fourth gear
32 Swingable pivot of the shift lever
33 Cam of the shift lever
34 Meshing element of the shift lever
35 Swingable pivot of switching wing 44
36 Cam of switching wing 44 for fourth gear
37 Shifting into gear motion of cam 36 for fourth gear
38 Shifting into gear motion of switching wing 44 for the fourth gear
39 Switching wing for reverse gear
40 Switching wing for second gear
41 Switching wing for sixth gear
42 Switching wing for third gear
43 Switching wing for fifth gear
44 Switching wing for fourth gear
45 Shift lever for fifth gear
46 Shift lever for third gear
47 Cam of the switching wing for second gear
48 Short shank
49 Long shank
50 Cam on switching wing 13 in neutral position
50' Cam on switching wing 13 in shift position
51 Meshing element on switching wing 44
G1 First gear
G2 Second gear
G3 Third gear
G4 Fourth gear
G5 Fifth gear

The invention claimed is:

1. A shifting mechanism for a multiple change-over gear, the shifting mechanism comprising:
an axially displaceable and pivoted gearshift lever shaft;
at least one shift finger located on the gearshift lever shaft;
switching wings operatively connected respectively with a synchronization and coupling device for a plurality of wheels supported on at least one wheel set shaft of a gearing unit; and
cams located on the switching wings with which the at least one shift finger meshes during a gear ratio modification, and the cams axially displacing the switching wings,
each of the switching wings (13, 39, 40, 41, 42, 43, 44) being assigned to at least one specific shift finger (3, 4, 5, 6, 7, 8, 9),
the cam (36, 47, 50) of each of the switching wings having an essentially U-shaped cross section profile with a short shank (11) and a long shank (12), a length of the short shank (11) being selected such that, in a first position, in a non-deviated position (N), the assigned shift finger being displaced laterally away over the short shank (11) to communicate with the long shank (12) and deflect the switching wing and, in a second position, being constructed for return movement of the switching wing to the non-deviated position (N) against the short shank (11).

2. The switching mechanism according to claim 1, wherein the cams (36, 47, 50) are not concentrically connected with a connecting segment (10) of the respective switching wings (13, 39, 40, 41, 42, 43, 44).

3. The switching mechanism according to claim 2, wherein the switching wings (13, 39, 40, 41, 42, 43, 44) are respectively pivoted on a swingable pivot (14, 35) and have a meshing element (15, 51) on an end that guides the cam (36, 47, 50).

4. The switching mechanism according to claim 3, wherein the meshing element (15, 51) is operatively connected with the assigned synchronization and coupling device of the change-over gear.

5. The switching mechanism according to claim 1, wherein a pivoted shift lever (31, 45, 46) features a first cam (33) which meshes with a shift finger of the gearshift lever shaft (2), the pivoted shift lever (31, 45, 46) has a meshing element (34), on an opposite end, which protrudes into a zone of contact of the cam (36, 50) of the switching wing (13, 39, 40, 41, 42, 43, 44).

6. The switching mechanism according to claim 1, wherein the shift fingers (3, 4, 5, 6, 7, 8, 9) are arranged on the gearshift lever shaft (2) in axially variable positions and have variable lengths.

7. The switching mechanism according to claim 1, wherein the cams (36, 47, 50) of the switching wings (13, 39, 40, 41, 42, 43, 44) feature have variable lateral distances from the gearshift lever shaft (2).

8. The switching mechanism according to claim 1, wherein the short and the long shanks (11, 12) of the cams (33, 36, 47, 50) of one or more of the switching wings (13, 39, 40, 41, 42, 43, 44) and the shift lever (31, 45, 46) are positioned in the switching mechanism (1) such that when shifting into a first gear (G1), a first assigned shift finger (3) moves freely over the short shank (11) of the a first cam (50) in a direction of the long shank (12), while a second shift finger (4) of a second gear (G2) located in a same switching lane, moves away from the long shank (49) of a second cam (47) assigned to the second gear (G2), moves freely over a third shank (48).

9. The switching mechanism according to claim 1, wherein the switching mechanism is arranged on one of a five-speed or a six-speed change-over gear whose axial wheel set arrangement, starting from a low gear element, is as follows: reverse gear (RG) and second gear (G2), fourth gear (G4) and sixth gear (G6), third gear (G3) and first gear (G1), fifth gear (G5) and, in a case of a seven-gear gearing unit, seventh gear (G7).

10. The switching mechanism according to claim 9, wherein the gearing unit is a rear gear unit with at least one counter shaft and at least one gearing unit primary shaft.

11. The switching mechanism according to claim 9, wherein the gearing unit is a one of a double coupling unit, a manual change-over gear unit and an automatically shiftable change-over gear unit with only one low gear and switch coupling.

12. The switching mechanism according to claim 1, wherein the switching mechanism is operated by an external switching mechanism having an H-gear shifting gate (16).

* * * * *